(12) United States Patent
Tsukada et al.

(10) Patent No.: US 7,255,188 B2
(45) Date of Patent: Aug. 14, 2007

(54) HYBRID VEHICLE

(75) Inventors: Yoshiaki Tsukada, Wako (JP);
Masahiro Kuroki, Wako (JP); Takashi Ozeki, Wako (JP); Takashi Tsutsumizaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/938,892

(22) Filed: Sep. 9, 2004

(65) Prior Publication Data

US 2005/0087376 A1    Apr. 28, 2005

(30) Foreign Application Priority Data

Sep. 29, 2003  (JP) .............................. 2003-338819

(51) Int. Cl.
*B60K 6/04* (2006.01)
*B60K 1/00* (2006.01)

(52) U.S. Cl. .................. 180/65.5; 180/65.2; 180/65.3; 180/65.6; 180/220

(58) Field of Classification Search ...... 180/65.1–65.7, 180/68.1–2, 218–220
See application file for complete search history.

(56) References Cited

U.S. PATENT DOCUMENTS

| | | | | |
|---|---|---|---|---|
| 4,567,958 A | * | 2/1986 | Ishihara | 180/230 |
| 5,101,924 A | * | 4/1992 | Yamagiwa et al. | 180/220 |
| 6,109,383 A | * | 8/2000 | Matsuto et al. | 180/220 |
| 6,155,366 A | * | 12/2000 | Lin | 180/65.2 |
| 6,547,024 B2 | * | 4/2003 | Ohyama et al. | 180/227 |
| 6,663,524 B2 | * | 12/2003 | Gu et al. | 475/5 |
| 6,736,228 B2 | * | 5/2004 | Donohue et al. | 180/65.4 |

FOREIGN PATENT DOCUMENTS

| | | |
|---|---|---|
| DE | 41 24 479 | 1/1993 |
| DE | 197 09 457 | 9/1998 |
| DE | 199 14 526 | 10/1999 |
| DE | 100 45 533 | 4/2002 |
| DE | 102 51 041 | 5/2004 |
| JP | 8-175473 | 7/1996 |
| JP | 11278149 A | * 10/1999 |

* cited by examiner

*Primary Examiner*—Christopher P. Ellis
*Assistant Examiner*—Vaughn T. Coolman
(74) *Attorney, Agent, or Firm*—Hamre, Schumann, Mueller & Larson, P.C.

(57) ABSTRACT

In order to do away with the need for a power source switching operation, and to improve motor regeneration charge efficiency in a hybrid vehicle, a one-way clutch is provided between an internal combustion engine and an electric drive motor.

10 Claims, 4 Drawing Sheets

HYBRID VEHICLE

FIELD OF THE INVENTION

This invention relates to a hybrid vehicle having an internal combustion engine and an electric motor as power sources.

BACKGROUND OF THE INVENTION

Japanese patent laid-open No. Hei. 8-175473 discloses a hybrid vehicle that can switch between travel using an electric motor only and travel using an internal combustion engine only depending on travel conditions of the vehicle for the purpose of achieving lowered fuel consumption and lowered exhaust gas pollution. The hybrid vehicle has power from an internal combustion engine transmitted to a drive wheel by means of a V-belt type power transmission unit and a centrifugal clutch, and an electric motor is also connected to this drive shaft via a switching mechanism for carrying out switching of power of the V-belt transmission unit.

With the structure described above, since the centrifugal clutch is arranged between the drive shaft and the V-belt transmission unit, in the cases such as where a person is walking along pushing the vehicle, so called push walking, the V-belt transmission unit normally does not rotate. However, when switching the power source from the engine to the motor, a switching operation is necessary. Also, if regenerative braking is performed using the motor, since there is first the need to perform the switching operation and the centrifugal clutch is kept connected until the rotational speed of the engine falls below a specified value, power from the drive shaft is partially consumed by rotation of the V-belt power transmission unit, and charging efficiency at the time of regeneration is lowered.

Also, in this structure, if a motor for travel (motion) projects from the transmission case housing the V-belt transmission unit in the widthwise direction of the vehicle, there is a possibility of the area around the drive shaft becoming large and there is a desire to reduce the size by arranging the motor inside the transmission case. If the motor and the centrifugal clutch are both large, it is difficult to achieve reduction in size even if they are housed in the transmission case.

The present invention has been conceived in view of the above described situation, and an object of the invention is to do away with the need for a power source switching operation, improved motor regeneration charge efficiency, and improve layout efficiency inside a transmission case.

SUMMARY OF THE INVENTION

In order to solve the above described problems, a hybrid vehicle is provided comprising an internal combustion engine, a power transmission means for transmitting power from the engine to a drive wheel, a drive shaft connected to a driven side of the power transmission means and also connected to the drive wheel, an electric motor connected to the drive shaft, and a unidirectional power transmission means provided between the power transmission means and the drive shaft capable of transmitting power in one direction from the power transmission means to the drive shaft.

With this type of structure, because power transmission from the drive shaft side to the power transmission is normally disengaged at the time of shifting to a regeneration operation from the drive wheel to the motor, the disengage operation is not necessary. Since power transmitted at the time of regeneration operation from the drive wheel to the motor is not consumed by the power transmission means, it is possible to improve charging efficiency at the time of regeneration. Also, at the time of switching from a state where the drive source is only the engine to a state where the drive source is only the motor, since it is no longer necessary to have a drive source switching operation, power transmitted from the motor to the drive wheel is not consumed by drive of the power transmission means and it is possible to improve energy transmission efficiency. If a one-way clutch is used as unidirectional power transmission means, it is possible to reduce the overall size of the power unit compared to the case of using a centrifugal clutch.

The electric motor is an inner rotor type, and the unidirectional power transmission means is arranged inside the inner rotor. With this type of structure, even in the case where the inner rotor is inevitably made large due to requirements of specification, it is possible to make effective use of dead space that is likely to occur inside.

The power transmission means is constructed with a belt converter for transmitting power from the engine to the drive shaft using an endless belt and the belt converter is provided with resilient means for urging a driven side movable pulley in a widthwise direction of the vehicle, and the unidirectional power transmission means is arranged adjacent to the resilient means. With this type of structure, it is possible to make effective use of dead space that is likely to occur next to the resilient means and to further improve layout efficiency.

A power unit for the hybrid vehicle including a power source has a pivot section supported in a swingable manner at the center, and the motor is arranged adjacent to a driven side pulley of the power transmission means. With this type of structure, since the distance between the motor and the transmission means is made as short as possible, it is possible to suppress power consumption between the two to the utmost and to further improve layout efficiency.

The hybrid vehicle comprises the power transmission means and the motor may be provided inside a transmission case, and the motor may be cooled by cooling air introduced into the transmission case. With this type of structure, not only is the power transmission means cooled by cooling air introduced inside the transmission case, but the motor can also be force cooled.

The hybrid vehicle may be a unit swing type two-wheeled vehicle.

DETAILED DESCRIPTION OF THE INVENTION

An embodiment of a hybrid vehicle of the present invention will now be described in the following with reference to the drawings of FIG. 1 to FIG. 4. In the following description, front side refers to the advancing direction of the vehicle, and right side and left side refer to the right side and the left side facing in the advancing direction of the vehicle.

Figure 1:
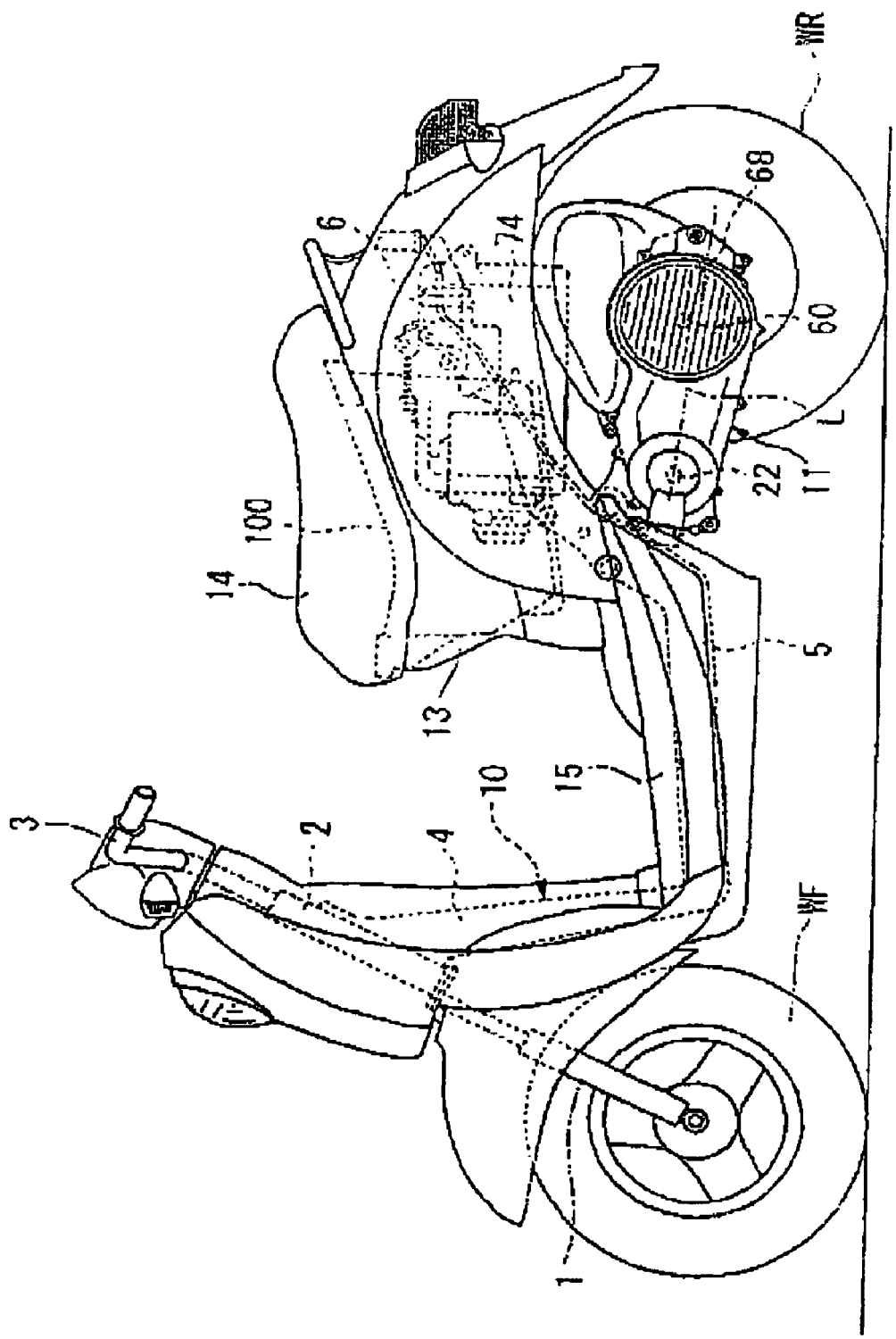
FIG. 1 is a side elevation of two-wheeled vehicle of one embodiment of the hybrid vehicle of the present invention.

As shown in FIG. 1, a hybrid vehicle of this embodiment is unit swing type two-wheeled vehicle, having a front fork 1 where a front wheel WF is axially supported at the front of the vehicle. This front fork 1 is pivoted on a head pipe 2, and can be steered by operating a handle 3. A downpipe 4 running to the rear and down is attached from the head pipe 2, and a middle frame 5 extends substantially horizontally from a lower end of this down pipe 4. Also, a rear frame 6 is formed running rearwards and upwards from a rear end of the middle frame 5. One end of a power unit 11, as a drive power source, is pivoted to the vehicle frame 10 constructed in this way, This power unit 11 has a rear wheel WR, that is a drive wheel, rotatably attached to another rearward end, and is suspended from a rear cushion attached to the rear frame 6, which means that a swingable unit swing type is constituted with the pivoted section as a center. Also, the outer periphery of the vehicle frame 10 is covered by a vehicle cover 13, with a seat 14 for a rider to sit on being fixed to the rear and on an upper surface of the vehicle cover 13. A step floor 15 for the rider to place their feet on is formed further forward than the seat 14. A storage box 100 functioning as utility space for storing a helmet or luggage is provided below the seat 14.

Figure 2:
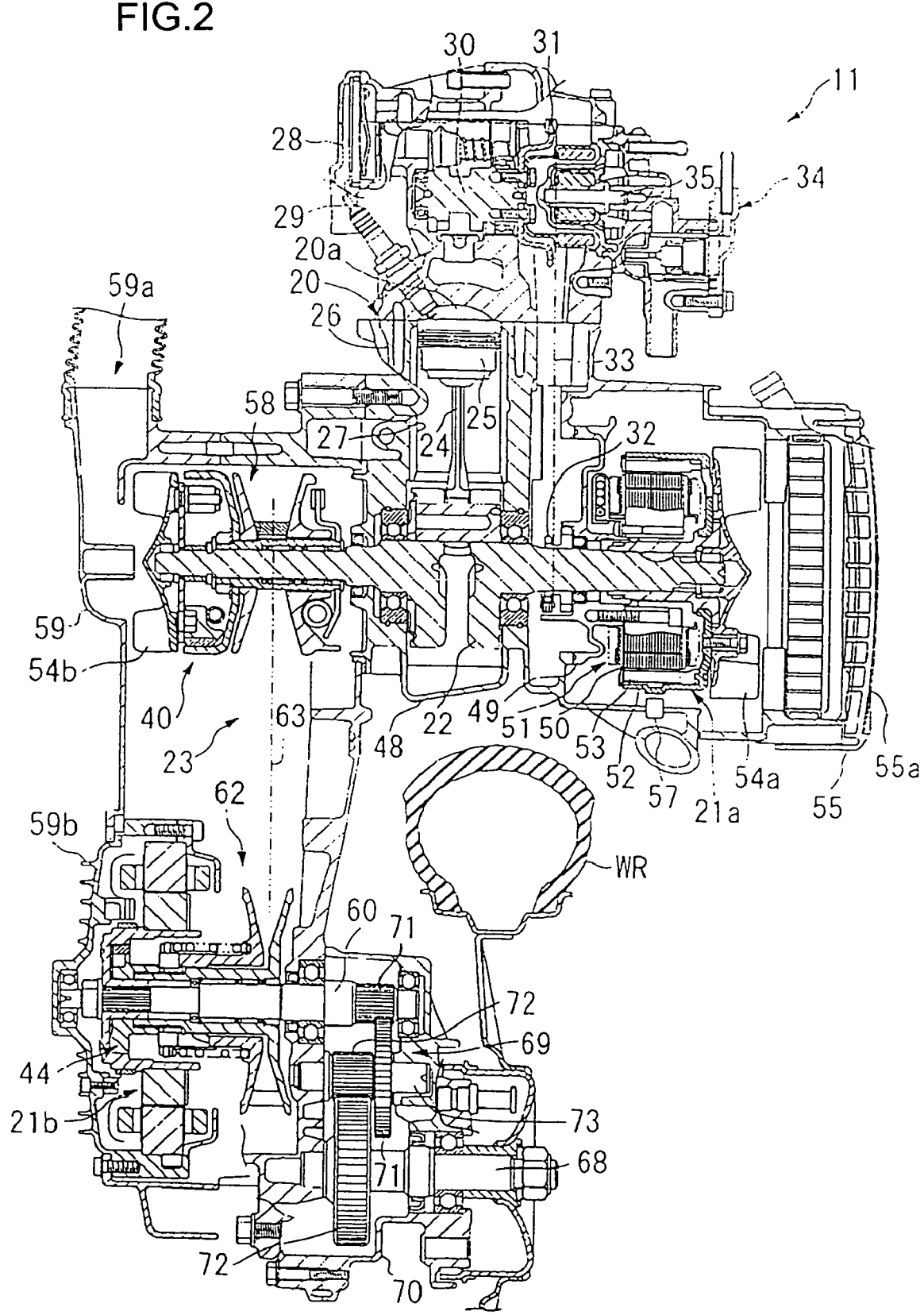
FIG. 2 is a cross sectional drawing showing a power unit of the two-wheeled vehicle shown in FIG. 1.

As shown in FIG. 2, the power unit 11 is comprised of an engine 20, being an internal combustion engine obtaining output by combusting an inflammable fuel air mixture, an ACG starter motor 21a functioning as a starter motor and an electrical generator, a continuously variable transmission (power transmission means) 23 connected to a crank shaft 22 for transmitting drive force from the engine 20 to the rear wheel WR, which is a drive wheel, a starter clutch 40 for engaging and disengaging drive force transmission between the crank shaft 22 and a drive side of the continuously variable transmission 23, a drive motor 21b functioning as a motor or an electrical generator, a one-way clutch (unidirectional power transmission means) 44 for transmitting drive force from the engine 20 and drive motor 21b to the rear wheel WR side but not transmitting force from the rear wheel WR to the engine 20 side, and a reduction gear mechanism 69 for reducing output from the continuously variable transmission 23 and transmitting to the rear wheel WR.

Drive force from the engine 20 is transmitted from the crank shaft 22 through the starter clutch 40, continuously variable transmission 23, one-way clutch 44, driven shaft (drive shaft) 60 and reduction gear mechanism to the rear wheel WR. On the other hand, drive force from the drive motor 21b is transmitted to the rear wheel WR through the driven shaft 60 and the reduction gear mechanism 69. Specifically, the driven shaft 60 of the continuously variable transmission 23, constituting a drive shaft for the rear wheel WR via the reduction gear mechanism 69, doubles as a motor output shaft of the drive motor 21b.

A battery 74 is connected to the ACG starter motor 21a and the drive motor 21b. When the drive motor 21b functions as a motor and the ACG starter motor 21a functions as a starter, this battery 74 supplies electrical power to the motors 21a and 21b, while when the ACG starter motor 21a and the drive motor 21b are functioning as electrical generators the electrical power they generate is used to recharge the battery. Control of the engine 20, ACG starter motor 21a and the drive motor 21b are performed by a control unit, being control means.

The engine 20 has a structure for taking in and combusting a fuel air mixture made up of air from an intake pipe and fuel, and a throttle valve for controlling the amount of air is provided inside the intake pipe in a rotatable manner. This throttle valve rotates according to the extent of operation of a throttle grip (not shown in the drawing) operated by the rider. An injector for jetting fuel and a negative pressure sensor for detecting negative pressure inside the intake pipe are arranged between the throttle valve and the engine 20. If the throttle grip is operated a lot, the throttle valve opens a large amount, and a large amount of air flows through, and the intake pipe negative pressure detected by the negative pressure sensor is small. Accompanying this, the air amount and fuel amount taken in to the engine 20 is increased. On the contrary, if the throttle grip is operated only slightly, the throttle valve opens a small amount, and a small amount of air flows through, and the intake pipe negative pressure detected by the negative pressure sensor is large. Accompanying this, the air amount and fuel amount taken in by the engine 20 is reduced.

Next, with reference to FIG. 2, one embodiment of a power unit 11 including the engine 20 and the drive motor 21b will be described. The engine 20 is provided with a piston 25 connected via a con rod 24 to the crankshaft 22. The piston 25 is capable of reciprocating inside a cylinder 27 provided in a cylinder block 26, and the cylinder block 26 is arranged so that the axis of the cylinder 27 is substantially horizontal. Also, a cylinder head 28 is fixed to the front surface of the cylinder block 26, and a combustion chamber 20a for combustion of the fuel air mixture is formed by the cylinder head 28, cylinder 27 and piston 25.

Valves (not shown) for controlling intake or exhaust of the fuel air mixture to and from the combustion chamber 20a, and a spark plug 29, are provided in the cylinder head 28. Opening and closing of the valves is controlled by rotation of a camshaft 30 pivoted in the cylinder head 28. The cam shaft 30 has a driven sprocket 31 on one end, with a continuous cam chain 33 wound between the driven sprocket 31 and a drive sprocket 32 provided on one end of the crank shaft 22. As a result, the camshaft 30 is coupled to rotation of the cranks shaft 22, and can be caused to rotate. A water pump 34 for cooling the engine 20 is also provided on one end of the camshaft 30. The water pump 34 is attached so that a rotation shaft 35 rotates integrally with the camshaft 30. Therefore, if the camshaft 30 is rotated, the water pump 34 can be activated.

A stator case 49 is connected to a right side, in the vehicle width direction, of the crankcase 48 pivotally supporting the crankshaft 22, and the ACG starter motor 21a is housed inside the stator case 49. This ACG starter motor 21a is a so-called outer rotor type motor, and a stator of the motor is constituted of a coil 51 having conducting wires wound around teeth 50 fixed to the stator case 49. On the other hand, an outer rotor 52 is fixed to the crankshaft 22, and has a substantially cylindrical shape covering the outer periphery of the stator. A magnet 53 is also arranged on an inner surface of the outer rotor 52. A fan 54a for cooling the ACG starter motor 21a is attached to the outer rotor 52, and if this fan 54a is rotated in synchronism with the crankshaft 22, air for cooling is taken in from a cooling air intake port formed in a side surface 55a of the cover 55 of the stator case 49.

A transmission case 59 is connected to a left side, in the width direction of the vehicle, of the crankcase 48, and this transmission case holds a fan 54b fixed to a left end of the crank shaft 22, continuously variable transmission 23 having a drive side connected to the crank shaft 22 via the starter clutch 40, and a drive motor 21b connected to a driven side of the continuously variable transmission 23.

The fan 54b is for cooling the continuously variable transmission 23 and the drive motor 21b housed in the transmission case 59, and is arranged at the same side as the drive motor 21*b*, with respect to the continuously variable transmission 23, that is in this embodiment, at the left side in the width direction of the vehicle. The cooling air intake port 59*a* is formed at a vehicle body front side and left side of the transmission case 59, and if the fan 54*b* rotates in synchronism with the crank shaft 22 external air is taken in to the inside of the transmission case 59 from the cooling air intake port 59*a* positioned close to the fan 54*b* to forcibly cool the drive motor 21*b* and the continuously variable transmission 23.

Figure 4:
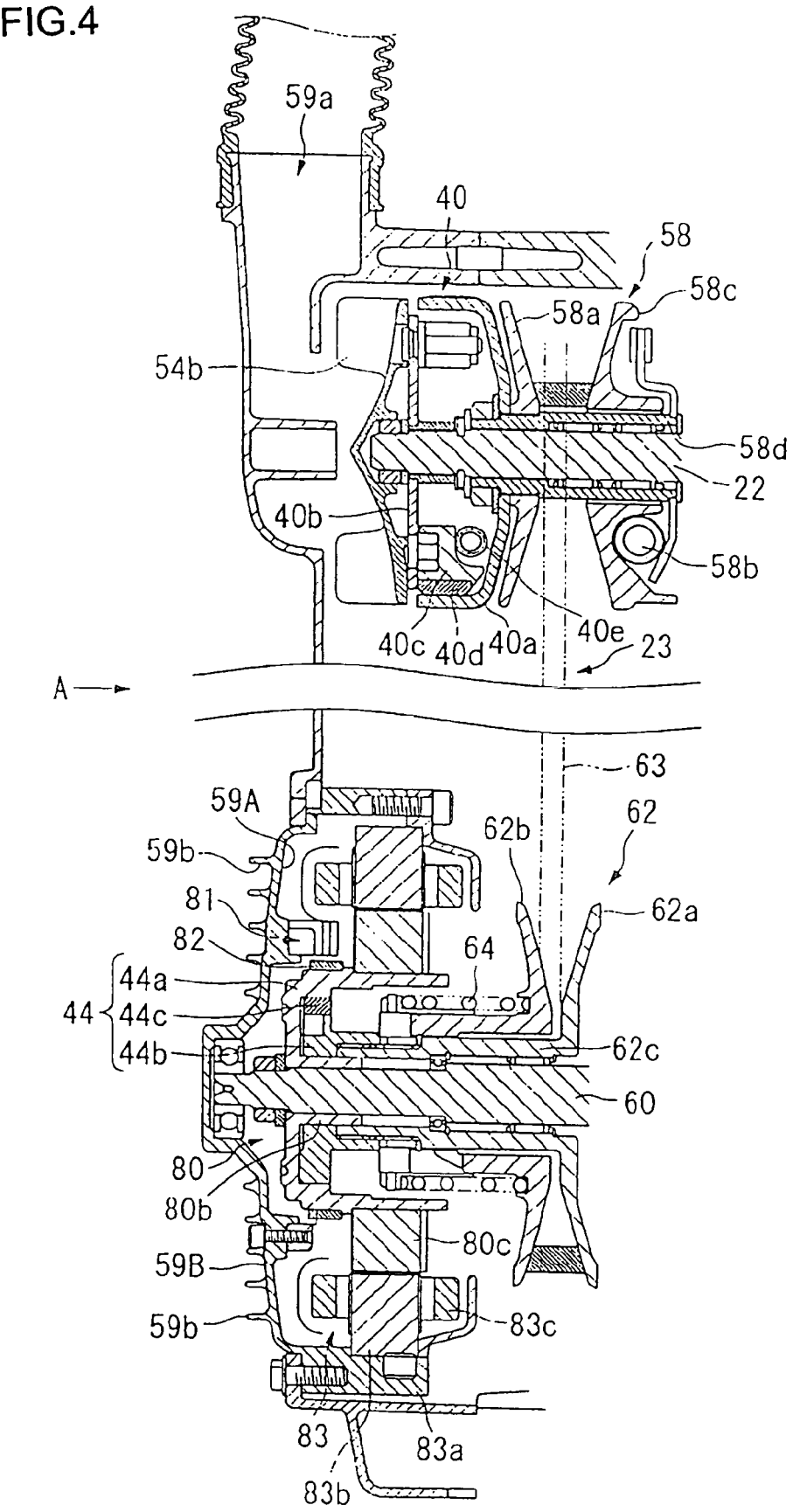
FIG. 4 is an enlarged view of main parts of FIG. 2.

The continuously variable transmission 23 has a belt converter constituted by an endless V-belt (endless belt) 63 wound between a drive side transmission pulley 58 mounted via the starter clutch 40 to a left end of the crank shaft 22 protruding from the crankcase in a widthwise direction of the vehicle, and a driven side transmission pulley 62 mounted via the one way clutch 44 to the driven shaft 60 pivotally supported on the transmission case 59 holding an axial line parallel to the crank shaft. The drive side transmission pulley 58, as shown in enlarged form in FIG. 4, is mounted so as to rotate in a circumferential direction with respect to the crank shaft 22, via a sleeve 58*d*, and is made up of a drive side fixed pulley half body 58*a* that is fixed on the sleeve 58*d*, and a drive side movable pulley half body 58*c* that is attached so as to be capable of sliding in an axial direction with respect to the sleeve 58*d* but is incapable of rotation in the circumferential direction.

On the other hand, the driven side transmission pulley 62 is comprised of a driven side fixed pulley half body 62*a* attached so that sliding in the axial direction with respect to the driven shaft 60 is restricted but capable of rotation in the circumferential direction, and a driven side movable pulley half body (driven side movable pulley) 62*b* attached on a boss section 62*c* of the driven side fixed pulley half body 62*a* capable of sliding in the axial direction. The endless V-belt 63 is then wound in belt grooves having a V-shaped cross section that are respectively formed between the drive side fixed pulley half body 58*a* and the drive side movable pulley half body 58*c*, and between the driven side fixed pulley half body 62*a* and the driven side movable pulley half body 62*b*. A spring (resilient means) 64 for normally urging the driven side movable pulley half body 62*b* towards the driven side fixed pulley half body 62*a* is arranged on a rear surface side (left side in the width direction of the vehicle) of the driven side movable pulley half body 62*b*.

In this structure, if the rotational speed of the crank shaft 22 rises, for the drive side transmission pulley 58, centrifugal force acts on a weight roller 58*b* and the drive side movable pulley half body 58*c* slides to the drive side fixed pulley half body 58*a* side. The drive side movable pulley half body 58*c* moves closer to the drive side fixed pulley half body 58*a* by the extent of the sliding, and since the groove width of the drive side transmission pulley 58 is now reduced the contact position of the drive side transmission pulley 58 and the V-belt 63 slips to a radially outer side of the drive side transmission pulley 58, so that the diameter the V-belt 63 is wrapped round is increased. Accompanying this, in the driven side transmission pulley 62 the groove width formed by the driven side fixed pulley half body 62*a* and the driven side movable pulley half body 62*b* is increased. Specifically, in response to rotational speed of the crankshaft 22, the diameter the V-belt 63 is wrapped around (transmission pitch diameter) various continuously, and the gear ratio is automatically and continuously varied.

The starter clutch 40 is provided more to the outside of the vehicle body than the continuously variable transmission 23 (in this embodiment the left side in the vehicle width direction) that is, between the drive side fixed pulley half body 58*a* and the fan 54*b*, and close to the cooling air intake port 59*a* formed in the transmission case 59. This starter clutch 40 is provided with a cap shaped outer case 40*a* fixed to the sleeve 58*d*, an outer plate 40*b* fixed to a left end of the crank shaft 22, a shoe 40*d* attached to an outer edge of the outer plate 40*b* via a weight 40*c* so as to face in a radially outer direction, and a spring 40*e* for urging the shoe 40*d* to the radially outer side.

With this structure, if engine speed, that is, rotational speed of the crank shaft 22, is less than a specified value (for example, 3,000 rpm) transmission of drive force between the crank shaft 22 and the continuously variable transmission 23 is disengaged. If the engine speed rises and the rotational speed of the crank shaft 22 exceeds the specified value, centrifugal force acting on the weight 40*c* resists the urging force from the spring 40*e* acting towards the radially inner side, and the weight 40*c* is moved to the radially outer side, as a result of which the shoe 40*d* presses the inner peripheral surface of the outer case 40*a* with a force greater than the specified value. In this way, rotation of the crankshaft 22 is transmitted via the outer case 40*a* to the sleeve 58*d*, and the drive side transmission pulley 58 fixed to the sleeve 58*d* is driven.

The one-way clutch 44 comprises a cup shaped outer clutch 44*a*, an inner clutch 44*b* pressed in coaxially with the outer clutch 44*a*, and a roller 44*c* enabling transmission of rotational force in only one direction from the inner clutch 44*b* to the outer clutch 44*a*. The outer clutch 44*a* also serves as an inner rotor body of the drive motor 21*b*, and is the same member as the inner rotor body. Also, the inner periphery of the inner clutch 44*b* and the left end of the boss section 62*c* of the driven side fixed pulley half body 62*a* are spline connected to each other. In this way, the one-way clutch 44 is arranged inside the inner rotor 80 of the drive motor 21*b* constituting the inner rotor shape, and is also arranged close, in a vehicle width direction, to the spring 64 arranged at the rear surface side (left side in the vehicle width direction) of the driven side movable pulley half body 62*b*.

In this structure, instead of the drive force from the engine 20 side transmitted to the driven side transmission pulley 62 of the continuously variable transmission 23 being transmitted to the rear wheel WR through die driven side fixed pulley half body 62*a*, inner clutch 44*b*, outer clutch 44*a*, namely the inner rotor body, driven shaft 60 and reduction gear mechanism 69, drive force from a rear wheel WR side when pushing the vehicle or at the time of regenerative motion is transmitted up to the reduction gear mechanism 69, driven shaft 60 and inner rotor body, that is, the outer clutch 44*a*, but since this outer clutch 44*a* slips with respect to the inner clutch 44*b* there is no transmission to the reduction gear mechanism 23 and the engine 20.

The drive motor 21*b* of the inner rotor format for making the driven shaft 60 the motor output shaft is provided at a vehicle rear side of the transmission case 59. That is, the drive motor 21*b* of this embodiment is attached to the reduction gear mechanism 69 via the driven shaft 60, and the motor output shaft, that is, the driven shaft 60, is ranged so as to be oriented in the vehicle width direction. The inner rotor 80 is comprised of the driven shaft 60, also being the output shaft of the continuously variable transmission 23, the cup shaped inner rotor, namely the inner clutch 44*b*, spline fined to the driven shalt using the boss section 80*b* formed on a central part, and a magnet 80*c* arranged on an opening side outer surface of the inner clutch 44*b*. A plurality of elements to be detected 82 that will be detected by a rotor sensor 81 attached to an inner wall 59A of the transmission case 59 are mounted on a bottom side outer surface of the inner clutch 44b. On the other hand, the stator 83 is made up of a coil 83c having conductive wires wound around teeth 83b fixed to the stator case 83a inside the transmission case 59.

Because the drive motor 21b has the above structure, as well as a function as an electric motor when assisting output of the engine 20, it also functions as an electrical generator (generator) for recharging the battery 74, not shown in FIG. 2, when rotation of the driven shaft 60 is converted to electrical energy. A PWM (Pulse Width Modulation) signal for controlling the drive motor 21b and electrical power at the time of regeneration are input and output to terminals (omitted from the drawings).

Figure 3:
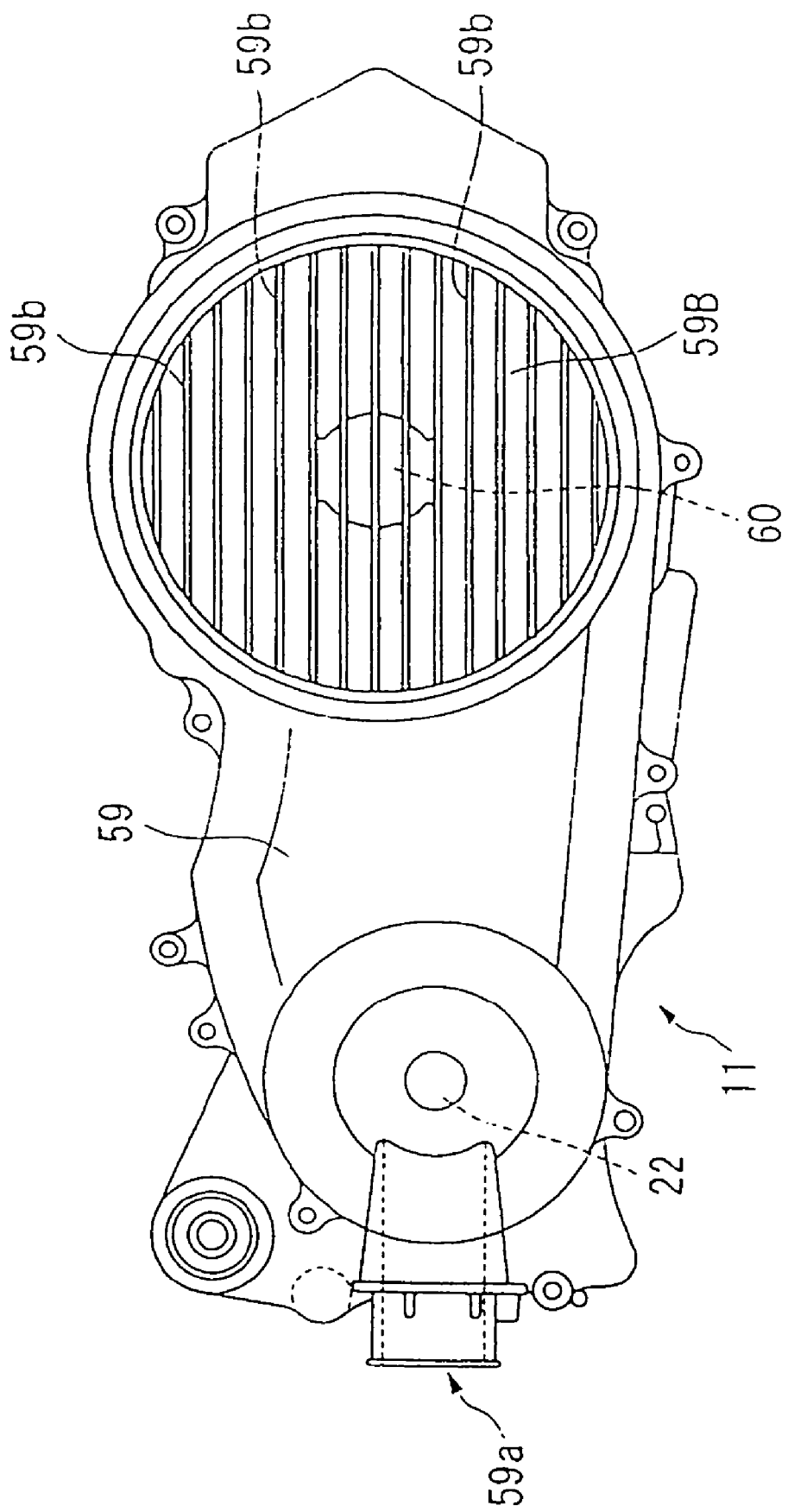
FIG. 3 is an enlarged view of the power unit shown in FIG. 1.

Also, the drive motor 21b is direct-mounted to the inner wall 59A of the cast transmission case 59 via the stator case 83a, and as shown in FIGS. 3 and 4, a plurality of cooling fins 59b extending to the rear of the vehicle are provided at equal distances from each other on the outer wall 59B of the transmission case 59 corresponding to direct mounting positions. That is, in plan layout, the drive motor 21b is arranged more to the outer side in the vehicle width direction (left side) than the continuously variable transmission 23, in other words, at an opposite side to the reduction gear mechanism 69 sandwiching the continuously variable transmission 23. Also, looking at the side of the vehicle in FIG. 1, the drive motor 21b is arranged higher up than a line L connecting the crank shaft 22 and the axle 68 of the rear wheel WR, and further forward than the axle 68. That is, the drive shaft 60, being the output shaft of the drive motor 21b, is positioned higher up than the line L.

The reduction gear mechanism 69 is provided inside the transmission chamber 70 on the rear right side of the transmission case 59, and as well as being provided with a middle shaft 73 pivotally supported parallel to the drive shaft 60 and the axle 68 of the rear wheel WR, is provided with a pair of first reduction gears 71, 71 respectively formed at a right end part of the driven shaft 60 and a central part of the middle shaft 73, and a pair of second reduction gears 72, 72 respectively formed at a right end of the middle shaft 73 and a left end of the axle 68. With this structure, rotation of the driven shaft 60 is reduced at a specified reduction ratio, and transmitted to the axle 68 of the rear wheel WR pivoted parallel to the driven shaft.

The control unit for control of the engine 20, ACG starter motor 21a and the drive motor 21b is control means comprising a CPU (Central Processing Unit), ROM (Read Only Memory) and RAM (Random Access Memory). This control unit receives information from devices such as a throttle opening amount sensor for detecting opening amount of the throttle valve, a negative pressure sensor, rotor sensors 57, 81 and outputs specified control signals to each of the drivers of the drive motor 21b and the ACG starter motor 21a, and to an ignition device for actuating the spark plugs 29 of the engine 20.

With the hybrid vehicle having the above-described structure, at the time of starting the engine, the crank shaft 22 is caused to rotate using the ACG starter motor 21a on the crankshaft 22. At this time, the starter clutch 40 is not connected, and transmission of drive force from the crankshaft 22 to the continuously variable transmission 23 is disengaged. Then, in synchronism with rotation of the crank shaft 22, a fuel air mixture taken in to the inside of the cylinder 27 is combated by the spark plug, and the piston 25 is caused to reciprocate. Then, according to the operation amount of the throttle grip, if the rotational speed of the crankshaft 22 exceeds a specified value (for example, 3000 rpm) rotational force of the crankshaft 22 is transmitted via the starter clutch 40 to the continuously variable transmission 23, one-way clutch 44 and reduction gear mechanism 69, to drive the rear wheel WR.

At the time of starting, the drive motor 21b activated due to feed from the battery 74, and it is possible to assist rotation of the driven shaft 60 by engine drive force. Also, instead of starting using the engine 20, it is possible to start using only the drive motor 21b. In this case, rotation of the driven shaft 60 using the drive motor 21b is not transmitted to the driven side transmission pulley 62 because of the one-way clutch 44, and the continuously variable transmission 23 is not driven. In this way, when traveling by driving the rear wheel WR using only the drive motor 21b, energy transmission efficiency is improved.

When traveling using only the engine 20, if the load is large, such as when accelerating or going fast, it is also possible to assist engine travel using the drive motor 21b. At this time, rotational force of the crank shaft 22 due to reciprocation of the piston 25 is transmitted to the driven shaft 60 via the starter clutch 40, the continuously variable transmission 23 and the one-way clutch 44, and drive force from the drive motor 21b is also transmitted via the one-way clutch 44, and these combined forces drive the rear wheel WR via the reduction gear mechanism 69. Conversely, when traveling using only the drive motor 21b, it is also possible to assist motor travel using the engine 20.

When traveling at a steady speed (cruise travel) in the case of traveling with only the drive motor 21b as a drive source, if the connected rotation speed of the starter clutch 40 is less than the specified value, even if the engine 20 is operating, the continuously variable transmission 23 is not driven and it is possible to generate electrical power using the ACG starter motor 21a. At the time of this steady speed travel, when traveling with only the drive motor 21b as a drive source, power transmission from the drive motor 21b to the rear wheel WR is carried out without driving the continuously variable transmission 23, which means that energy transmission efficiency is improved.

At the time of deceleration, the one-way clutch 44, does not transmit rotation of the driven shaft 60 to driven side transmission pulley 62 of the continuously variable transmission 23, which means that the continuously variable transmission 23 is not driven and it is possible to regenerate rotation of the axle 68 to the drive motor 21b directly via the reduction gear mechanism 69. Specifically, at the time of regenerative drive to the drive motor 21b from the rear wheel WR, drive force transmitted from the rear wheel WR to the drive motor 21b is not consumed by the continuously variable transmission 23, and so recharge efficiency at the time of regeneration is improved.

As has been described above, in the hybrid vehicle of this embodiment, by providing the one-way clutch 44 that is capable of transmitting drive force in one direction from the continuously variable transmission 23 to the driven shaft 60 between the continuously variable transmission 23 and the driven shaft 60, power transmission from the driven shaft 60 side to the engine 20 side is always disengaged. Therefore, when shifting to regenerative drive to the drive motor 21b from the rear wheel WR, as well as the fact that the above described disengaging operation is not necessary, since drive force transmitted from the rear wheel WR to the drive motor 21b is not consumed by the continuously variable transmission 23 at the time of regeneration, recharge efficiency is improved. Also, at the time of switching from a state where the drive source is only the engine 20 to a state where the drive source is only the drive motor 21b, since it is no longer necessary to have a drive source switching operation and power transmitted from the drive motor 21b to the rear wheel WR when traveling using only the drive motor 21b is not consumed by drive of the continuously variable transmission 23, it is possible to improve energy transmission efficiency. Also, since the one-way clutch 44 is used as unidirectional power transmission means, it is possible to reduce the size of the power unit 11 even if a centrifugal clutch is used.

Since the drive motor 21b is configured as an inner rotor type, and the one-way clutch 44 is arranged at an inner part of the inner rotor 80, it is possible to effectively utilize dead space arising at the inner part even if the inner rotor 80 is unavoidably made large due to specification requirements etc., and it is possible to reduce the size of the power unit 11. Because the continuously variable transmission 23 is arranged close to the spring 64 urging the driven side movable pulley half body 62b in a widthwise direction of the vehicle, it is also possible to make effective use of dead space likely to occur in the vicinity of the spring 64, and it is possible to reduce the size of the power unit 11.

In addition to the above, with this embodiment the starter clutch 40 is provided between the crankshaft 22 and the continuously variable transmission 23, and when the rotational speed of the crank shaft 22 exceeds a specified value rotational force of the crankshaft 22 is transmitted to the continuously variable transmission 23, which means that the following effects are obtained. Specifically, since power transmission between the crankshaft 22 and the continuously variable transmission 23 is disengaged when the rotational speed of the engine falls below the specified value, instead of rear wheel drive by the engine 20 it becomes possible to drive the rear wheel using the drive motor 21b that generally has a large torque at low rotation. In this way it is possible to reduce drive loss in a low rotational speed region. Also, when rotational speed of the engine is low, such as when idling, since rotational force of the crankshaft 22 is not consumed by the continuously variable transmission 23 but is efficiently convened to electrical energy by the ACG starter motor 21a, generating efficiency of the ACG starter motor 21a is improved. Since the continuously variable transmission 23 is not driven when waiting for traffic signals, it is possible to suppress the generation of friction.

In addition, with this embodiment, due to the fact that the starter clutch 40 and the drive motor 21b are arranged further outwards in a widthwise direction of the vehicle than the continuously variable transmission 23, it is possible to expose the starter clutch 40 and the drive motor 21b to the outside by simply opening the transmission case 59 housing these components. As a result it is possible to improve maintainability and improve attachability. Also, since the starter clutch 40 and the drive motor 21b are arranged at the same side with respect to the continuously variable transmission 23, it is possible to narrow the dimension in the width direction compared to other arrangements as the continuously variable transmission is enclosed. Because the starter clutch 40 is arranged close to the cooling air intake ports 59a formed in the transmission case 59, it is possible to efficiently forcibly cool the starter clutch 40 using external air taken into the transmission case 59 from the cooling air intake ports 59a, and cooling capability of the starter clutch 40 is improved. Since the starter clutch 40 and the drive motor 21b are arranged on the opposite side to the ACG starter motor 21a sandwiching the continuously variable transmission 23, the starter clutch 40 and the drive motor 21b arranged on the same side with respect to the continuously variable transmission 23, and the ACG starter motor 21a which is heavy compared to the starter clutch 40 and the drive motor 21b, are split in a widthwise direction of the vehicle (left-right direction) either side of the continuously variable transmission 23.

In addition, with this embodiment, if, as a result of connecting fan 54b to the crankshaft 22, and arranging the drive motor 21b and the fan 54b inside the transmission case 59 at the same side with respect to the continuously variable transmission 23, the fan 54b rotates together with the crankshaft 22, a swirling flow is generated inside the transmission case 59 as a result of this rotation. It is therefore possible to efficiently cool the drive motor 21b, that has a large heat dissipation. It is also possible to forcibly control the drive motor 21b, even when there is no traveling wind such as at the time of idling when waiting for traffic signals or the like. Also, as well as the fact that the drive motor 21b is attached to the inner wall 59A of the transmission case 59 and cooling efficiency is improved because heat generated from the drive motor 21b is conveyed directly to the case outer surface and cooled by traveling wind, since it is possible to carry out cooling utilizing swirling flow generated inside the transmission case 59 by the fan 54b, it is possible to improve cooling capability of the drive motor 21b. Also since the cooling fins 59b are provided on the drive motor attachment section outer surface (outer wall 59B) of the transmission case 59, it is possible to further improve the cooling capability using traveling wind.

In addition to the above, since with this embodiment the drive motor 21b is attached to the reduction gear mechanism 69, that is, the driven shaft 60, it is possible to reduce and transmit power from the drive motor 21b to the rear wheel 69 using the reduction gear mechanism 69 provided between the continuously variable transmission 23 and the rear wheel WR. Therefore, compared to a motor direct type power unit where the drive motor 21b is directly connected to the axle 68 and the reduction gear mechanism is not provided between the continuously variable transmission 23 and the rear wheel WR, the following effects can be obtained. Specifically, although the generated power of the drive motor is the same in both situations, even in cases where speed must be finally reduced, it is not necessary to add a new reduction gear mechanism between the continuously variable transmission 23 and the rear wheel WR, and it is possible to prevent an increase in the number of parts. On the other hand, when power finally transmitted to the rear wheel WR is shared, it is possible to further reduce the size of the drive motor 21b.

In addition to the above described structure, since the drive motor 21b is arranged at the opposite side to the reduction gear mechanism 69 sandwiching the continuously variable transmission 23, the drive motor 21b and reduction gear mechanism 69, which are heavy, are divided in a widthwise direction (left-right direction) on either side of the continuously variable transmission 23. Since the drive motor 21b is arranged higher than the line L connecting the crankshaft 22 and the axle 68, looking from the side of the vehicle, the drive motor 21b of a hybrid vehicle, which tends to be large, is positioned higher up, and for a two-wheeled vehicle the drive motor 21b is arranged so that a longitudinal direction of the motor output shaft (driven shaft 60) is oriented in a widthwise direction of the vehicle in order to make it possible to ensure a larger bank angle, and since the motor output shaft is arranged further forward than the axle 68 it is possible to shorten the length in a longitudinal direction of the vehicle.

The present invention is by no means limited to each of the above embodiments and various design modifications are possible providing such modifications do not deviate from the spirit of the present invention. For example, the subject of application is not limited to a two-wheeled vehicle, and the present invention can also be applied to other moving bodies such as three or four wheeled vehicles. Also, with the above-described embodiments, a belt converter (continuously variable transmission 23) is used as the power transmission means, but other gearing mechanisms are also possible. The attachment position of the drive motor 21b is not limited to the rear wheel, and can also be the front wheel WF. The unidirectional power transmission means is not limited to the one-way clutch of the above-described embodiment, and can be any type, such as a ratchet, as long as power is only transmitted in one direction. Also, the attachment position of the unidirectional power transmission means is not limited the driven shaft 60, and can also be to the axle 68 or the middle shaft 73.

We claim:

1. A hybrid vehicle comprising an internal combustion engine, a crank shaft driven by the engine, a power transmission connected to the crank shaft to transmit power from the engine to a drive wheel that is mounted on an axle, a drive shaft behind the crank shaft and connected to a driven side of the power transmission and also connected to the drive wheel, the drive shaft is not coaxial to the axle, an electric motor connected to the drive shaft, the electric motor including a rotor that is rotatable about an axis that is coaxial with the drive shaft, and the motor is an inner rotor type wherein the rotor comprises an inner rotor, and a unidirectional power transmission provided between the power transmission and the drive shaft capable of transmitting power in one direction from the power transmission to the drive shaft, the unidirectional power transmission is arranged inside the inner rotor and includes an outer clutch member that serves as the inner rotor.

2. The hybrid vehicle of claim 1 wherein the unidirectional power transmission further includes an inner clutch member, the power transmission includes a driven side pulley with a driven side fixed pulley half and a driven side movable pulley half, and the inner clutch member is connected to the driven side fixed pulley half.

3. The hybrid vehicle of claim 1 wherein the power transmission includes a belt converter for transmitting power from the engine to the drive shaft using an endless belt, and the belt converter is provided with means for urging a driven side movable pulley in a widthwise direction of the vehicle, and the unidirectional power transmission is arranged adjacent to the means for urging.

4. The hybrid vehicle of claim 1 wherein the engine and the power transmission are part of a power unit that is pivotally connected to the vehicle, and the motor is arranged adjacent to a driven side pulley of the power transmission.

5. The hybrid vehicle of claim 1 wherein the vehicle is a two-wheeled vehicle.

6. The hybrid vehicle of claim 1 wherein the power transmission and the motor are provided inside a transmission case, and the motor is cooled by cooling air introduced into the transmission case.

7. The hybrid vehicle of claim 1, further comprising a reduction gear mechanism connected to the drive shaft and the drive wheel; and wherein the power transmission includes a pulley mounted on the drive shaft, the motor and the reduction gear mechanism are disposed on opposite sides of the pulley, the reduction gear mechanism is between the pulley and the axle, and the motor and the engine are disposed on opposite sides of the pulley.

8. The hybrid vehicle of claim 1, wherein the drive shaft is disposed above a straight line connecting the crank shaft and the axle of the drive wheel.

9. The hybrid vehicle of claim. 8, wherein the drive shaft is positioned forwardly of the axle.

10. The hybrid vehicle of claim 1, further comprising a starter motor connected to the crank shaft.

* * * * *